(12) United States Patent
Li et al.

(10) Patent No.: US 11,212,723 B2
(45) Date of Patent: Dec. 28, 2021

(54) METHOD, APPARATUS AND COMPUTER PROGRAM PRODUCT FOR AUTONOMOUS CELL CHANGE BY UE IN NETWORK

(75) Inventors: Haitao Li, Beijing (CN); Dalsgaard Lars, Oulu (FI); Yang Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 50 days.

(21) Appl. No.: 14/401,438

(22) PCT Filed: May 31, 2012

(86) PCT No.: PCT/CN2012/076337
§ 371 (c)(1),
(2), (4) Date: Nov. 14, 2014

(87) PCT Pub. No.: WO2013/177778
PCT Pub. Date: Dec. 5, 2013

(65) Prior Publication Data
US 2015/0133121 A1    May 14, 2015

(51) Int. Cl.
*H04W 36/00* (2009.01)
*H04W 24/10* (2009.01)
*H04W 36/34* (2009.01)

(52) U.S. Cl.
CPC ....... *H04W 36/0085* (2018.08); *H04W 24/10* (2013.01); *H04W 36/0058* (2018.08); *H04W 36/00835* (2018.08); *H04W 36/34* (2013.01)

(58) Field of Classification Search
CPC . H04W 36/0083; H04W 24/10; H04W 36/34; H04W 36/0085; H04W 36/0058; H04W 36/00835
See application file for complete search history.

(56) References Cited

U.S. PATENT DOCUMENTS 6,647,262 B1 * 11/2003 Demetrescu ......... H04W 36/34
370/331
6,845,238 B1    1/2005 Muller
(Continued)

FOREIGN PATENT DOCUMENTS

EP    2343919 A2    7/2011
EP    2458919       5/2012
(Continued)

OTHER PUBLICATIONS

International Search Report and Written Opinion received for corresponding Patent Cooperation Treaty Application No. PCT/CN2012/076337, dated Aug. 23, 2012, 11 pages.
"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331, V10.4.0, Dec. 2011, 1-296.
(Continued)

*Primary Examiner* — Dinh Nguyen
(74) *Attorney, Agent, or Firm* — Mintz Levin Cohn Ferris Glovsky and Popeo, P.C.

(57) ABSTRACT

A method, an apparatus and a corresponding computer program product are proposed. Wherein one of the method according to one embodiment of the invention determines at least one cell in a network sharing context of at least one user equipment with at least one other cell within the network. Then creates at least one measurement configuration being used by the at least one user equipment, wherein the at least one measurement configuration indicates at least to the at least one user equipment that it can decide whether to perform cell change without transmitting back its measurement report to its serving cell. Then method further transmits the created at least one measurement configuration to the at least one user equipment.

19 Claims, 6 Drawing Sheets

(56) References Cited

U.S. PATENT DOCUMENTS

| | | | |
|---|---|---|---|
| 8,908,638 B2 | 12/2014 | Chi et al. | |
| 2005/0107110 A1* | 5/2005 | Vasudevan | H04W 36/34 455/525 |
| 2006/0111111 A1* | 5/2006 | Ovadia | H04L 41/0213 |
| 2007/0224992 A1 | 9/2007 | Dalsgaard et al. | |
| 2008/0139205 A1* | 6/2008 | Sayeedi | H04W 36/0038 455/436 |
| 2009/0270103 A1 | 10/2009 | Pani et al. | |
| 2009/0290555 A1* | 11/2009 | Alpert | H04W 4/20 370/331 |
| 2010/0323633 A1* | 12/2010 | Pani | H04W 24/10 455/67.14 |
| 2011/0205928 A1* | 8/2011 | Pelletier | H04L 1/1883 370/252 |
| 2011/0244858 A1 | 10/2011 | Callender | |
| 2011/0274012 A1* | 11/2011 | Jang | H04W 36/14 370/259 |
| 2015/0011219 A1* | 1/2015 | Saily | H04W 36/0094 455/436 |

FOREIGN PATENT DOCUMENTS

| | | |
|---|---|---|
| EP | 2458920 | 5/2012 |
| EP | 2458921 | 5/2012 |
| WO | 2011089058 | 7/2011 |
| WO | 2013/123643 A1 | 8/2013 |

OTHER PUBLICATIONS

"3rd Generation Partnership Project; Technical Specification Group Radio Access Network; Evolved Universal Terrestrial Radio Access (E-UTRA); User Equipment (UE) Procedures in Idle Mode (Release 10)", 3GPP TS 36.304, V10.4.0, Dec. 2011, pp. 1-33.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11)", 3GPP TS 36.300, V11.0.0, Dec. 2011, pp. 1-194.

"Testing Mobile Station Cell Transitions and Handovers", Agilent Technologies, May 23, 2007, 18 pages.

Holma et al., "WCDMA for UMTS: HSPA Evolution and LTE", Wiley publications, Fourth edition, 2007, 574 Pages.

Kim et al., "mSCTP-DAC: Dynamic Address Configuration for mSCTP Handover*", International conference on Embedded and Ubiquitous Computing, vol. 4096, 2006, pp. 244-253.

Al Mosawi et al., "A Fast Handover Scheme Based on Smart Triggers and SIP", IEEE 70th Vehicular Technology Conference Fall, Sep. 20-23, 2009, pp. 1-5.

Extended European Search Report received for corresponding European Patent Application No. 12877858.6, dated Dec. 22, 2015, 11 pages.

"On Retaining RRC Context", 3GPP TSG RAN WG2 Meeting #77b, R2-121550, Agenda item: 7.2.2, IPWireless Inc., Mar. 26-30, 2012, pp. 1-7.

* cited by examiner

METHOD, APPARATUS AND COMPUTER PROGRAM PRODUCT FOR AUTONOMOUS CELL CHANGE BY UE IN NETWORK

RELATED APPLICATION

This application was originally filed as PCT Application No. PCT/CN2012/076337 filed May 31, 2012.

FIELD OF THE INVENTION

The present invention generally relates to cell change in a network. In particular, the invention relates to autonomous cell change by UE in wireless networks.

BACKGROUND

Under the quick development of mobile technique and various portable terminals providing attracting applications, people become more and more to rely on such portable terminals not only for entertainment but also for business. The portable or mobile terminal can be but is not limited to devices such as smart phones, laptop computers, handsets, stations, units, devices, multimedia tablets, Personal Digital Assistants (PDAs), or any combination thereof. Upon imposing such important role on those terminals, requirements on better quality of service and more capacity of the network fuel the operator and technical engineers to always seek improved solutions providing competitive products and services. Then Long Term Evolution (LTE) was introduced to alleviate such heavy burden on the networks. However, a non-ignorable percentage of the mobile traffic is generated from indoors, LTE operating at higher frequencies in fact cannot fully meet the increasing demand on speed of data traffic and quality of service. Therefore, in order to enhance the access ability and offload traffic in certain areas, heterogeneous networks and local area offloading concept are proposed. In this case, the severe distance between the expectations of users and the present situation was shortened, but another problem raise therefrom.

In the heterogeneous networks, significant amount of signaling typically exchanged between the user equipment (UE) and corresponding access node during the UE's moving across the networks.

SUMMARY

The present invention proposes a method, an apparatus and a computer program product to at least alleviate the signaling overhead of UE by enabling UE to autonomous cell change during its moving.

According to a first aspect of the present invention, there is provided a method comprising: determining at least one cell in a network sharing context of at least one user equipment with at least one other cell within the network; creating at least one measurement configuration being used by the at least one user equipment, wherein the at least one measurement configuration indicates at least to the at least one user equipment that it can decide whether to perform cell change without transmitting back its measurement report to its serving cell; and transmitting the created at least one measurement configuration to the at least one user equipment.

According to one embodiment of the invention, the determining step determines only neighbor cell(s) relative to the cell performing the method, and the created measurement configuration(s) is transmitted real-time, periodically or randomly. Alternatively or additionally, this step determines not only neighbor cell(s) but all the cells sharing context of user equipment with at least one other cell. In this case, such created measurement configuration(s) can be pre-loaded into user equipment, and then after it is powered on, updated measurement configuration(s) may be transmitted to the user equipment real-time, periodically or randomly, if any.

According to one embodiment of the invention, the created at least one measurement configuration indicates to the at least one user equipment such enabled self decision on cell change by a specific identifier and/or by any different configurations compared with normal measurement configurations of normal user equipment assisted and network controlled handover procedure.

According to one embodiment of the invention, the measurement can be performed at any appropriate frequencies comprising at least one of inter-frequency, intra-frequency and inter radio access technologies. This means the cell serving the user equipment and a potential targeted cell may work at the same frequency, different frequency and even different radio access technologies. If inter-frequency or inter radio access technologies is indicated in the measurement configuration, and cells can be identified by its operating frequency, such frequency information may help the UE to recognize the type of the measurement configuration, i.e., a normal one or the one for autonomous cell change.

According to one embodiment of the invention, the created measurement configuration further comprises information indicating at least one of following: at least one neighbor cell relative to the current serving cell of said at least one cell which shares the context with at least one other cell; at least one frequency to be measured; at least one measurement event; and event related parameter including threshold value and/or measurement gap. That is to say, a created measurement configuration can either indicate merely neighbor cell(s) supporting the autonomous cell change, or indicate all the cells determined as supporting the autonomous cell change. It is readily understand that the former one reduce the amount of data to be transmitted via network, while the latter one provide a relatively full information thus reduce the number of interactions through network. Then those skilled in the art can use either one or combination of the two according to specific network environment and corresponding requirements.

According to one embodiment of the invention, wherein the network is a heterogeneous network in which at least one small cell with a relatively smaller coverage locates adjacent to or within at least one of said at least one cell. In the latter case, an access node of said at least one cell acts as a concentrate access node, while an access node of said at least one small cell acts as a sub access node, wherein the concentrate access node provides access service to the sub-access node, and the method can be implemented by either the concentrate access node or the sub-access node.

According to one embodiment of the invention, the created measurement configuration will be used by the at least one user equipment when moving between said at least one cell and said at least one small cell, moving between the small cells, or moving between the cells. Specifically, the moving may from a sub-cell towards an area covered by its serving concentrate cell, another sub-cell within its serving concentrate cell, a neighbor cell/small cell or a sub-cell within a neighbor concentrate cell. In a reverse direction, user equipment may move from one cell to a neighbor cell/small cell, to a sub cell within this cell, or to a sub cell within one of its neighbor cell.

According to one embodiment of the invention, the network is a Long Term Evolution network.

According to one embodiment of the invention, an access node of the small cell (i.e., the cell with relatively small coverage and being deployed additionally in the network) can be one of pico eNB, Closed Subscriber Group home eNB and femto eNB.

According to a second aspect of the present invention, there is provided a method, comprising: maintaining at a user equipment at least one measurement configuration created at network side, wherein at least one cell in the network shares context of the user equipment with at least one other cell within the network, and the at least one measurement configuration indicates to the user equipment that it can decide whether to perform cell change without transmitting back its measurement report to its serving cell; performing measurement based on the maintained at least one measurement configuration to check if there is any other cell within the network providing better signal quality than its current serving cell; and performing cell change directly without transmitting its measurement report back to its current serving cell, if the target cell provides better signal quality than the current serving cell.

According to one embodiment of the invention, the maintained at least one measurement configuration created at the heterogeneous network side indicates to the user equipment such enabled self decision on cell change by a specific identifier and/or by any different configurations compared with normal measurement configurations of normal user equipment assisted and network controlled handover procedure.

According to one embodiment of the invention, the maintained at least one measurement configuration further comprises information indicating at least one of following: at least one neighbor cell relative to the current serving cell of said at least one cell which shares the context with at least one other cell; at least one frequency to be measured; at least one measurement event; and event related parameter including threshold value and/or measurement gap.

Then according to a further embodiment of the invention, the at least one neighbor cell supporting the autonomous cell change is organized in a list (preferably with the frequencies respective cell operating on). In the above two cases, UE may perform measurement on the signal received from a cell indicated therein based on the measurement configuration. In a case that a sub access node uses different frequency with its serving concentrate access node, UE may be configured to initiate autonomous cell change when performing cell change (such as from a sub cell to its serving concentrate cell or other cell, or the vice versa). If this is the case, UE may simply recognize a measurement configuration for autonomous cell change from such different frequencies used by the cells.

According to one embodiment of the invention, the user equipment further maintains at least one normal measurement configuration of normal user equipment assisted and network controlled handover procedure, and the method further comprising steps of: determining, at least before performing cell change, whether an obtained measurement is performed in according to the normal measurement configuration; and if it is the normal measurement configuration, transmitting the obtained measurement report to its current serving cell instead of performing cell change directly. This means not all the cells in the network support the autonomous cell change of the invention, then UE may decide whether to transmit its measurement report back according to the specific type of a measurement configuration based on which the measurement is conducted.

According to one embodiment of the invention, the type of the maintained measurement configurations is determined based on a specific identifier and/or any different configurations between the maintained measurement configuration created at the heterogeneous network and the normal measurement configuration of normal user equipment assisted and network controlled handover procedure. As will be described in more detail below, various manners can be used here, such as any identifier, or any differences recognizable by UE between the two types of measurement configurations.

According to one embodiment of the invention, wherein the network is a heterogeneous network in which at least one small cell with a relatively smaller coverage locates adjacent to or within at least one of said at least one cell; in the latter case, an access node of said at least one cell acts as a concentrate access node, while an access node of said at least one small cell acts as a sub access node, wherein the concentrate access node provides access service to the sub-access node, and the maintained measurement configuration is created by either the concentrate access node or the sub-access node. That is to say, said small cell(s) with relatively smaller coverage may also be arranged as a neighbor cell adjacent to one cell with larger coverage instead of as a sub-cell within it. In this case, when UE is moving, it may move between a macro cell and a small cell, or between macro cells or between small cells or the like.

According to one embodiment of the invention, wherein the measurement can be performed at any appropriate frequencies comprising at least one of inter-frequency, intra-frequency and inter radio access technologies. Further, the measurement can be performed by the user equipment on signal received from any other cell when the user equipment is moving from a cell towards an area covered by a neighbor cell or a neighbor small cell, a neighbor sub-cell within a neighbor concentrate cell, or a neighbor sub-cell within said cell, or moving from a sub-cell towards an area covered by its serving concentrate cell, another sub-cell within its serving concentrate cell or another sub-cell within its serving concentrate cell, a neighbor cell/small cell or a sub-cell within a neighbor concentrate cell, if the network is heterogeneous.

According to one embodiment of the invention, the maintained at least one measurement configuration is either pre-loaded into the user equipment or received from the network after powered on. According to another embodiment of the invention, if a condition of a measurement event defined in the maintained at leas one measurement configuration is met, it means a better signal quality.

According to one embodiment of the invention, the network is a Long Term Evolution network, an access node of the small cell can be one of pico eNB, Closed Subscriber Group home eNB and femto eNB, if the network is heterogeneous.

According to a third aspect of the invention, there is provided an apparatus comprising: at least one processor; and at least one memory comprising computer program code, the at least one memory and the computer program code configured to, with the at least one processor, cause the apparatus to perform at least the following: determining at least one cell in a network sharing context of at least one user equipment with at least one other cell within the network; creating at least one measurement configuration being used by the at least one user equipment, wherein the at least one measurement configuration indicates at least to the at least one user equipment that it can decide whether to perform cell change without transmitting back its measurement report to its serving cell; and transmitting the created at least one measurement configuration to the at least one user equipment.

According to a fourth aspect of the present invention, there is provided An apparatus, comprising: at least one processor; and at least one memory comprising computer program code, the at least one memory and the computer program code configured to, with the at least one processor, cause the apparatus to perform at least the following: maintaining at a user equipment at least one measurement configuration created at network side, wherein at least one cell in the network shares context of the user equipment with at least one other cell within the network, and the at least one measurement configuration indicates to the user equipment that it can decide whether to perform cell change without transmitting back its measurement report to its serving cell; performing measurement based on the maintained at least one measurement configuration to check if there is any other cell within the network providing better signal quality than its current serving cell; and performing cell change directly without transmitting its measurement report back to its current serving cell, if the target cell provides better signal quality than the current serving cell.

According to a fifth aspect of the present invention, there is provided a computer program product comprising computer executable program code recorded on a computer readable storage medium, the computer executable program code comprising: code for determining at least one cell in a network sharing context of at least one user equipment with at least one other cell within the network; code for creating at least one measurement configuration being used by the at least one user equipment, wherein the at least one measurement configuration indicates at least to the at least one user equipment that it can decide whether to perform cell change without transmitting back its measurement report to its serving cell; and code for transmitting the created at least one measurement configuration to the at least one user equipment.

According to a sixth aspect of the present invention, there is provided a computer program product comprising computer executable program code recorded on a computer readable storage medium, the computer executable program code comprising: code for maintaining at a user equipment at least one measurement configuration created at network side, wherein at least one cell in the network shares context of the user equipment with at least one other cell within the network, and the at least one measurement configuration indicates to the user equipment that it can decide whether to perform cell change without transmitting back its measurement report to its serving cell; code for performing measurement based on the maintained at least one measurement configuration to check if there is any other cell within the network providing better signal quality than its current serving cell; and code for performing cell change directly without transmitting its measurement report back to its current serving cell, if the target cell provides better signal quality than the current serving cell.

According to further embodiments of the fifth and sixth aspect of the present invention, the computer executable program code further comprising respective code portion for performing each of those other steps defined in any of above method.

According to the seventh aspect of the present invention, there is provided an apparatus, comprising: means for determining at least one cell in a network sharing context of at least one user equipment with at least one other cell within the network; means for creating at least one measurement configuration being used by the at least one user equipment, wherein the at least one measurement configuration indicates at least to the at least one user equipment that it can decide whether to perform cell change without transmitting back its measurement report to its serving cell; and means for transmitting the created at least one measurement configuration to the at least one user equipment.

According to the eighth aspect of the present invention, there is provided an apparatus, comprising: means for maintaining at a user equipment at least one measurement configuration created at network side, wherein at least one cell in the network shares context of the user equipment with at least one other cell within the network, and the at least one measurement configuration indicates to the user equipment that it can decide whether to perform cell change without transmitting back its measurement report to its serving cell; means for performing measurement based on the maintained at least one measurement configuration to check if there is any other cell within the network providing better signal quality than its current serving cell; and means for performing cell change directly without transmitting its measurement report back to its current serving cell, if the target cell provides better signal quality than the current serving cell.

According to further embodiments of the seventh and eighth aspect of the present invention, the apparatus further comprising respective means for performing each of those other steps defined in any of above method.

According to a ninth aspect of the present invention, there is provided an apparatus configured to perform all the operations/steps defined in any of above method.

According to those various embodiments proposed by the invention, an autonomous handover by UE is achieved thus signaling due to frequent measurement reporting is eliminated. Thereby UE mobility may be done in a more economic way with less signaling overhead and less UE power consumption which also decrease the cost at the network side.

Upon reading the following description with reference to the accompanying drawings which illustrated the principle of the invention, other aspects, features, characteristics, advantages and together with possible or feasible alternatives, modifications or the like in addition to above can be easily and well understood.

BRIEF DESCRIPTION OF THE DRAWINGS

The attached accompanying drawings illustrate exemplary embodiments of the invention, which are only for explaining the principle of the invention while not for limiting the invention from any aspect to those illustrated details both for network environments and operations thereof. It should be noted that those drawings show merely elements relating to the invention while omit other components may be necessary for operating a network, a device or a method flow or the ones popularly used/deployed thereof, for the sake of illustrating the invention concisely and clearly, but this not means those various embodiments of the invention exclude any of the above or any additional arrangements. Wherein.

DETAILED DESCRIPTION OF THE INVENTION

The exemplary embodiments of the present invention will be described in detail hereinafter with reference to the accompanying drawings. It should be noted that references to features, advantages, or similar language throughout this specification do not imply that all the features and advantages should be achieved in each embodiment of the invention, but mean a specific feature, advantage, or characteristic described in connection with an embodiment can be realized in at least one embodiment of the present invention. Moreover, it should be noted that for a person skilled in the art, it is conceivable that all the described features, advantages, and characteristics of the invention may be combined in any feasible way for meeting certain network/application specific requirements during implementations of the invention.

Figure 1:
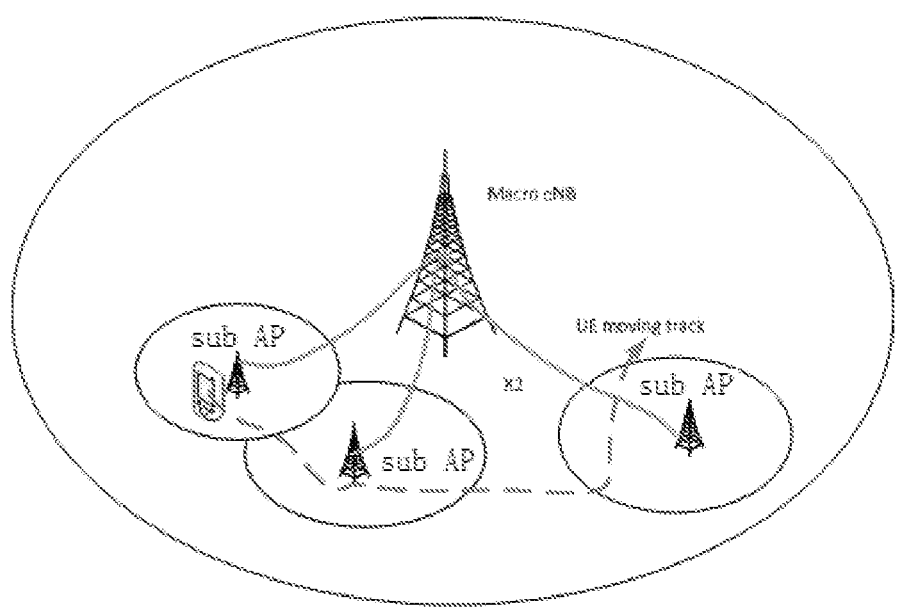
FIG. 1 is a diagram illustrating an exemplary network architecture in which various embodiments of the invention are applicable to be implemented.

FIG. 1 illustrates an exemplary LTE heterogeneous network architecture in which various embodiments of the invention are applicable to be implemented. Such heterogeneous architecture relates to local area offloading (LAO). As shown in FIG. 1, in this LTE network, in addition to traditional macro cells (wherein macro eNB serves as an access node thereof and provides access related services) widely deployed by operator, several sub cells with smaller size are also deployed to offload traffic burden on the macro cells. In practice, the coverage of sub cells can be provided by any of appropriate access nodes, for example, pico eNBs, CSG HeNBs, non-CSG HeNBs, Femto eNBs or the like. Wherein, those skilled in the art know that for different type of access nodes deployed, the specific network architecture may vary. Such small cells additionally deployed for providing further enhanced wireless coverage play important roles for their respective characteristic. For example, typically, pico eNBs are usually deployed by operator for offloading traffic in hot spot coverage, CSG (Closed Subscriber Group) and non-CSG HeNBs (Home evolved NodeB) or Femto eNBs are deployed by home users or enterprises for subscribed charging and services (between CSG and open cells, hybrid cells are deployed in some public places such as for example café or shopping mall by operator for better tradeoff of QoS provisioning between subscribers and open users). Generally, the wireless coverage provided by such additionally deployed small cells can be seen as a kind of local area network (LAN). Furthermore, such local area network can operate at a frequency point different from the macro cell. Then the network architecture shown in FIG. 1 can also be called as LTE-LAN, which is considered as having competitive characteristics with Wi-Fi. Although such LTE based network focused initially on indoor scenarios such as residential or enterprise use case, it now also focuses on some local area use cases and scenarios which may relate to moving related issues. As such architecture indeed alleviate conflict between the more and more heavy traffic and the scarce radio resources, it is considered by the inventors that will probably be deployed in a different but licensed or unlicensed band from the ones of the macro cells in the future.

Currently, one feasible architecture for such LTE based network is that, the additional deployed access point (AP) of a sub cell works under the macro eNB of a macro cell (like a sub-system of macro eNB/AP), while the macro eNB acts as a concentrator in radio access network (RAN) side. Thereby AP of a sub cell connects to core network (CN) via backhaul of its macro eNB (reuse S1-like or X2 interface of eNB to CN); this means there is no direct interface between AP of a sub cell and CN. In other words, such AP located within a sub cell is hided by the macro eNB from CN.

Considering different sizes of area covered by such small cell and macro cell, in order to differentiate these two kinds of cells and their respective access node, hereinafter, we call the former one as sub cell (or small cell, if such cell is deployed adjacent to rather than within a macro cell) and associated access node as sub access node (AP), and the latter one as (macro) cell and its access node as macro eNB or simply access node. Further, for a specific sub cell, to differentiate the macro cell covering this sub cell and its access node from other macro cells and their access nodes, we call this macro cell as serving (concentrate/macro) cell and its associated access node as serving (macro/concentrate) eNB or access node. However, the term of access node/AP/eNB used in this specification and attached claims should be interpreted broadly, they refer to a node or an apparatus providing wireless coverage and access service within a certain area, such as but is not limited to, eNode B, AP, base station and so on. Similarly, cell used here in this invention merely means an area or region covered by an access node (such as eNB, AP or the like), and it is not limited as any specific protocols, types of network or the like.

When UE moves into or out of such sub cell coverage, its mobility control issue should be solved. However, most current 3GPP specifications are proposed for normal macro based networks. For example, the above mobility control of UE is under a full control of the macro eNB assisted by UE. The full control is achieved by, for example, measurement configuration, handover preparation, handover command, etc., assisted by UE by transmitting its measurement report back to the macro eNB. Handover in such mode is called sometimes as UE assisted and network controlled handover procedure. For macro networks with relatively large scale coverage with a more homogeneous cell deployment layout, such network controlled UE assisted mobility does not introduce too much signaling overhead for normal speed UEs. However, in heterogeneous scenario, in a situation that more and more small cells are deployed throughout the macro networks or a higher moving speed of UE, handovers will become frequently, then such tight mobility control and frequent handovers may certainly produce considerable signaling overhead even for normal speed UE. This will decrease the overall system efficiency due to the increased signaling overhead, and further decrease potentially throughout of the network. For the user of the UE, both the significant power consumption and quite scarce radio resources are issues note worthy.

However, so far as the inventors know, there is no prior art talk about how to reduce the significant amount of signaling between UE and macro eNB, although it is an urgent issue to be solved.

In the invention, it proposes various embodiments in which when UE moves out of the coverage of its current serving cell (either a macro cell or a sub cell), UE is no longer required to transmit its measurement report to its serving cell for the network to control UE mobility. Hereinafter, details about such various embodiments and the solutions given in summary will be discussed in conjunction with the specific network architecture as shown in FIG. 1. However, it should be noted that this not mean the applicable environment suitable for performing the invention is limited to such specific network architecture. On contrary, those skilled in the art can readily understand from the basic concept or principle of the embodiments of the invention that, the present invention is also applicable to any types of heterogeneous or even homogeneous network architecture which have already been developed now or the ones being under development or being proposed in the future (from various embodiment illustrated below, it is obvious that the concept of the invention is also applicable to those homogeneous networks to facilitate handover performed at UE). Similarly, the aforementioned concentrator architecture and further different frequency points on which the macro and sub cell operate are not compulsory or necessary. For example, an environment without such two layers of cells or access nodes, such as a network in which pico eNodeB operates at the same frequency point with a macro cell and the relationship between them is peer-to-peer instead of one being in charge of the other. In this case, UE may move through those cells, such as from a macro cell to a macro/small cell (and vice versa). Similarly, a network in which multiple layers of cells from the managing aspect exist can also implement the embodiments of the invention, if such network is proposed in the future.

Considering the network architecture as shown in FIG. 1, autonomous handover (i.e., cell change, which is used exchangeable in the invention) by UE is achieved by preparing related measurement configurations in advance at the network side. Specifically, access nodes of cells performing a certain embodiment of the invention share context of UE with others, or at least with its neighboring cell(s) (macro or sub), thus allow UE to decide whether to conduct cell change itself without transmitting back its measurement report. Then indicating this fact in specific measurement configuration which is different from the normal ones used in the UE assisted and network controlled handover will enable UE to distinguish these two types of measurement configurations if not all the cells in the network support the invention, to perform measurement based on the non-normal measurement configuration, and further to perform cell change autonomously. Related operations on both the network side and UE according to one embodiment of the present invention will now be explained in detail referring to FIGS. 2 and 3 respectively.

Figure 2:
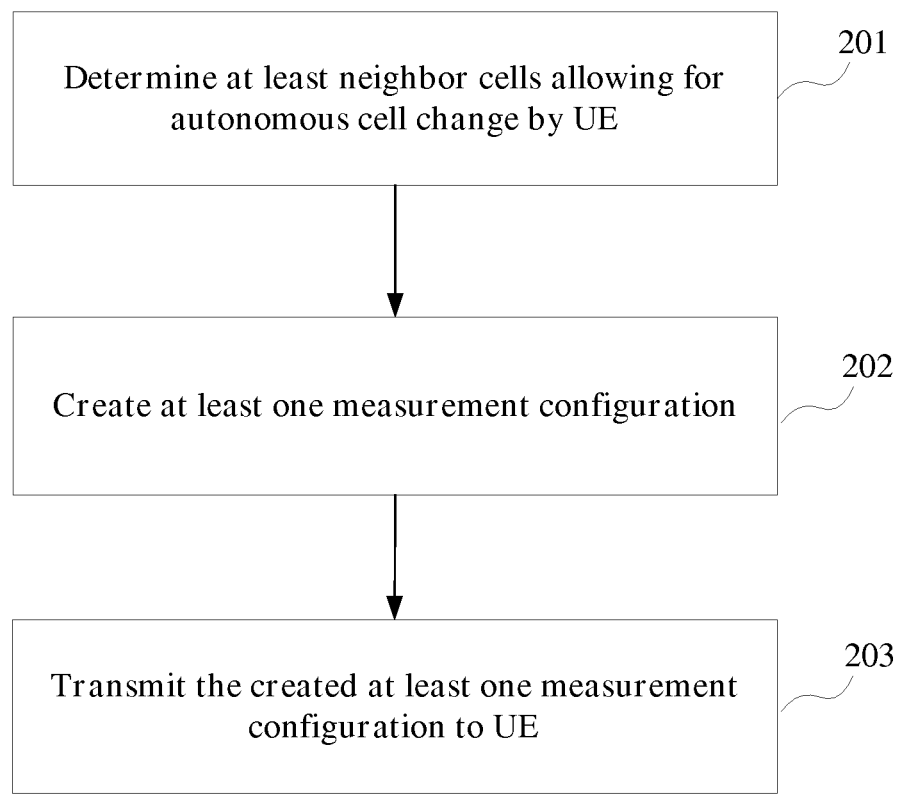
FIG. 2 is a process illustrating operations at the network side according to one embodiment of the invention.

Process shown in FIG. 2 can be implemented by any existing appropriate apparatus, device or the like fulfilling other functions or tasks, or by specific apparatus, device or the like for implementing a solution according to one embodiment of the invention. Also, this process can be implemented by a sub access node or a macro eNB, or by any other appropriate roles so long as the expected effects of a certain embodiment of the invention can be achieved. The apparatus for this process may locate at a single node, or at more than one separated nodes or locations.

As shown in FIG. 2, at block 201, the apparatus, such as the sub access node of UE's current serving sub cell or serving macro eNB of its serving macro cell, determines those cell(s) which support the implementations of the invention. Here supporting the implementations of the invention means sharing context with other cells. Take the environment shown in FIG. 1 as an example, this means macro eNB can share context of UE with other macro eNBs and/or its sub access nodes.

As stated in the summary, in this step, the apparatus can determine all the cells in the network which may share context of UE with at least one other (macro and/or sub) cell (i.e., supporting the invention). In this case, according to an embodiment of the invention, if the determined cells are further indicated in created measurement configurations which will be further described below, UE may know all the cells within the network which support such autonomous cell change in advance. Then UE may only receive additional measurement configurations when there are updates, such as some other cell(s) (either macro or sub) become support such autonomous cell change, i.e., share context of UE with other cell(s), or any cell cannot support the autonomous cell change any more, changes on previous measurement configuration, or any other changes.

Alternatively, the apparatus may merely determine whether its neighbor cell(s) (including macro and/or sub cell, if any) shares context of a user equipment. In this case, user equipment may receive new measurement configuration(s) as its moving. It is easy to understand that if user equipment just moves within one macro cell, such as from a sub cell to the macro or another macro cell (or possibly in an inverse direction), the abilities of cells may be constant and it may be a long time for UE to receive new measurement configuration(s).

As for the above determination, it can be made by means of various manners. For example, it can be made based on pre-defined information available for UE's current serving sub access point or macro eNB, such as information about which cell(s) support the invention is known in advance (for example when initially deploying the network, and it is more feasible if the abilities of cells within the network, i.e., whether share context of user equipment with other cell(s), change little with time). Alternatively or additionally, in an embodiment of the invention, cells not supporting the autonomous handover do not create measurement configuration of the invention (certainly, they may also be arranged as creating normal measurement configurations, which may depend on specific requirements when designing the network).

Other manners can be, for example, based on events or information exchanged thereof. For example, an event that notifying support of autonomous cell change by certain macro cell(s), or querying other macro or sub cell(s) about whether to support such autonomous cell change (this event may imply that the cell sending out this query support the autonomous cell change). Additionally, any other information exchanged between macro cells (such as a message which is unicasted, multicasted or broadcasted from a certain macro cell) and possibly indicates explicitly or implicitly the ability of supporting the invention may be used by the apparatus for make said determination.

For all the cells supporting the implementations of the invention, they may share Context of UE with each other. Alternatively, according to one embodiment of the invention, it is also possible that some of the cells share context of UE with only their neighbor cells rather than all the cells thereof. It should be noted that in some embodiments of the invention, context sharing is not limited to macro or homogeneous cells only, but is also applicable for cells additionally deployed, no matter whether such cells are deployed within macro cells as shown in FIG. 1, or are deployed as adjacent to them (which is not shown). In fact, it is feasible to have a default configuration that macro eNB and sub access node(s) share context of UE with each other.

Sharing UE's context ensures a UE to connect to a target cell directly without transmitting its measurement report to its serving macro eNB. If process is implemented in a signal layer access node, i.e., there is no concentrated architecture as shown in FIG. 1, operations shown in FIG. 2 may be performed at the access node of the serving cell (i.e., either a macro cell or a small cell additionally deployed as mentioned before). However, if this process is implemented in the architecture as shown in FIG. 1, operations shown in FIG. 2 can be performed by either the sub access node of UE's current sub cell or the macro eNB of its serving macro cell controlling the sub access node. This is because as mentioned above, a default configuration may be configured so that context information and other related information can be exchanged between the sub access node and the macro eNB.

Further, it will be easier for implementing the invention if all the cells in a network support the invention. This is because if it is determined that all the cells support the invention, it is possible that only a specific identifier or information indicating this fact in the created measurement configuration is enough. This is especially for the case that all the other information necessary for performing measurement is already known by UE or can be obtained in other manners by UE. Upon such information, UE may simply conduct an autonomous cell change without transmitting its measurement report back, and does not need to further determine whether the measurement is performed based on a normal configuration or the ones proposed in this invention (i.e., determine whether the targeted cell support the invention thus the target cell can obtain the context of UE from the current serving cell by context sharing).

But it is also possible that some of the cells support the implementations of the invention while others not. In this case, according to one embodiment of the invention, UE may conduct autonomous cell change as a default configuration if this is supported by relatively more cells. Then if failed, conduct the normal UE assisted and network controlled handover procedure (i.e., reporting its newly measurement result back to its serving macro eNB first, and then waiting for a command therefrom to handover to the targeted cell). Alternatively, according to another embodiment of the invention, UE may determine whether a target cell supports such autonomous cell change based on associated measurement configuration (the measurement configuration based on which UE performs a measurement on the received signal from the target cell). Such decision can be made upon any specific identifier(s) or specific configurations compared with normal ones, for example, different frequencies to be measured, different conditions for triggering cell change, different factors to be considered and so on.

At block 202, the apparatus creates at least one measurement configuration for UE. Such measurement configuration indicates to UE that it can decide whether to perform a handover itself without transmitting back its measurement report to its serving access node (such as macro eNB if UE has a direct connection and is served by it, or to its macro eNB via its sub AP if it locates in a sub cell within a certain macro cell). Information indicating the fact of enabled autonomous cell change can be any related content in a message, or simply a specific identifier (such as a new dedicated Information Element (IE)) or the like.

Further, according to one embodiment of the invention, the apparatus may indicate certain frequency to be measured by UE, i.e., the frequency on which those cells (at least the neighbor cells) operate on. Alternatively or additionally, it may comprise measurement event and/or any other event related parameter such as threshold, measurement gap and so on, and/or any other contents or possible combinations thereof in its created measurement configuration. Said measurement event refers to any events including any conditions triggering cell change based on the measured results. In other words, once the measurement results meet the defined measurement event, it means the cell being measured can provide a better signal quality thus it can be located as the target cell if perform cell change.

It should be noted that instead of the above specific identifier, certain content or the like indicating the enabled autonomous handover, any difference between the above definitions and the normal ones used in normal UE assistant and network controlled handover will imply that this measurement configuration is not a normal one.

For example, the apparatus may indicate in its created measurement configuration the frequency point to be measured by UE which is different from the ones defined in those normal measurement configurations. Then from such different frequency point to be measured, UE can recognize that this measurement configuration is not the conventional ones and is for autonomous handover. This is possible if cells supporting the implementations of the invention operates on a different frequency point from the cells conform normal network controlled handover procedure. Certainly, this is merely an exemplary scenario and the measurement conducted by UE in the present invention of course is not limited to it. For example, in addition to above inter frequency scenario, others such as intra-frequency or inter radio access technology or even intra radio access technology (i.e., measurements performed on those frequencies) are also applicable. Another example showing difference between the newly created and the normal measurement configuration relates to at least one item or parameter defined differently, for example, an event in the former one may be defined as triggering a handover decision while the same event in the latter one may be defined as triggering a transmission of a measurement report.

Another example showing difference between the newly created and the normal measurement configuration is that, in the newly created one, some items or parameters which are no longer necessary can be omitted, such as the measurement ID or the like.

Alternatively or additionally, according to one embodiment of the invention, the created measurement configuration may further comprise information indicating those cells supporting the invention, such as organizing those cells in a list with other optional parameters like frequency and physical cell identifier (PCI) or the like. In fact, it is not necessary or efficient way to organize all the cells supporting the invention all the time. This means for a cell either macro or small cell, containing indications of its neighboring cells (either macro or small cell) in its measurement configuration will be enough in most cases. This is because generally speaking, those neighboring cells are potential targeted cells. This means information on cells which physically locates long from each other can be omitted if the size of the measurement configuration is desired to be as small as possible.

Those skilled in the art will understand that above various configurations in the newly created measurement configurations are not necessary or compulsory, but can leave the network with control on such autonomous cell change to a certain extent. In other words, by configuring appropriate parameters, such as aforementioned frequency, event, threshold, measurement gap and so on, the network can still control and decide in what conditions a handover may perform.

At block 203, the apparatus transmits the newly created measurement configuration to UE.

In a further embodiment of the invention, upon the received measurement configuration, when UE moves into the coverage of a cell supporting the invention, its access node may receive a message about cell change from UE, wherein UE sends this message without transmitting its measurement report to its serving macro cell. Then the corresponding access node, either macro eNB or sub AP transmits an acknowledge message to UE.

Above we discussed operations on the network side mainly based on the architecture as shown in FIG. 1, in which the sub cells may operate on different frequency point from the macro cell thus inter-frequency measurement is one optional way for UE to differentiate the newly created measurement configurations from the normal ones in some cases (for example, UE is moving from a sub cell to its serving macro cell or to another macro cell).

However, another scenario is that, small cells may be deployed and operate in the same frequency with macro cell or in different RAT with macro cell. In the former case, network may configure intra-frequency measurement configuration to the UE. In the latter case, i.e., for the different RAT case, network may configure an inter-RAT measurement to be performed by UE. In this case, parameter of measurement gap is potentially used to help UE to perform measurements in order to enable a handover decision.

In according to one embodiment of the invention, measurement event optionally comprised in the measurement configuration may be associated with or not associated with the frequency to be measured, i.e., whether the measurement is intra-frequency, inter-frequency or inter-RAT measurement. Such event can be defined by the network which reflects a controllable configuration by the network. A simple definition on this measurement event is that reusing the existing normal event A3 and/or A4.

Specifically, Event A3 means that a neighbour becomes offset better than primary or serving cell, while Event A4 means that a neighbour becomes better than a threshold. For both the two events, UE should consider entering into the neighbour cell if corresponding condition is met, and leaving its current serving or primary cell if corresponding condition is meet.

Wherein, the conditions of entering and leaving for even A3 are listed below respectively;

$Mn+Ofn+Ocn-Hys>Mp+Ofp+Ocp+\text{Off}$ $Mn+Ofn+Ocn+Hys<Mp+Ofp+Ocp+\text{Off}$

Wherein, the conditions of entering and leaving for even A4 are listed below respectively:

$Mn+Ofn+Ocn-Hys>\text{Thresh}$ $Mn+Ofn+Ocn+Hys<\text{Thresh}$

Wherein, Mn is the measurement result of the neighbouring cell, not taking into account any offsets, Ofn is the frequency specific offset of the frequency of the neighbour cell (i.e. offsetFreq as defined within measObjectEUTRA corresponding to the frequency of the neighbour cell), Ocn is the cell specific offset of the neighbour cell (i.e. cellIndividualOffset as defined within measObjectEUTRA corresponding to the frequency of the neighbour cell) which is set to zero if not configured for the neighbour cell, Hys is the hysteresis parameter for this event (i.e. hysteresis as defined within reportConfigEUTRA for this event), and Thresh is the threshold parameter for this event (i.e. a4-Threshold as defined within reportConfigEUTRA for this event). Wherein, Mn is expressed in dBm in case of Reference Signal Received Power (RSRP), or in dB in case of Reference Signal Received Quality (RSRQ), Ofn, Ocn, Ofp, Ocp, Hys, Off is expressed in dB, and Thresh is expressed in the same unit as Ms.

As aforementioned, the cell that triggers the event is on the frequency for example indicated in the associated measObject which may be different from the (primary) frequency used by the current serving cell.

Above are some discussions on related operations performed at the network side according to some exemplary embodiments of the present invention. Now discussions about related operations performed at counter part, i.e., UE, will be given in conjunction with FIG. 3. Process as shown in FIG. 3 can be performed at any kind of user equipment, comprising but not limited to mobile terminal or portable terminal such as smart phones, laptop computers, handsets, stations, units, devices, multimedia tablets, communicators, Personal Digital Assistants (PDAs), or any combination thereof.

Figure 3:
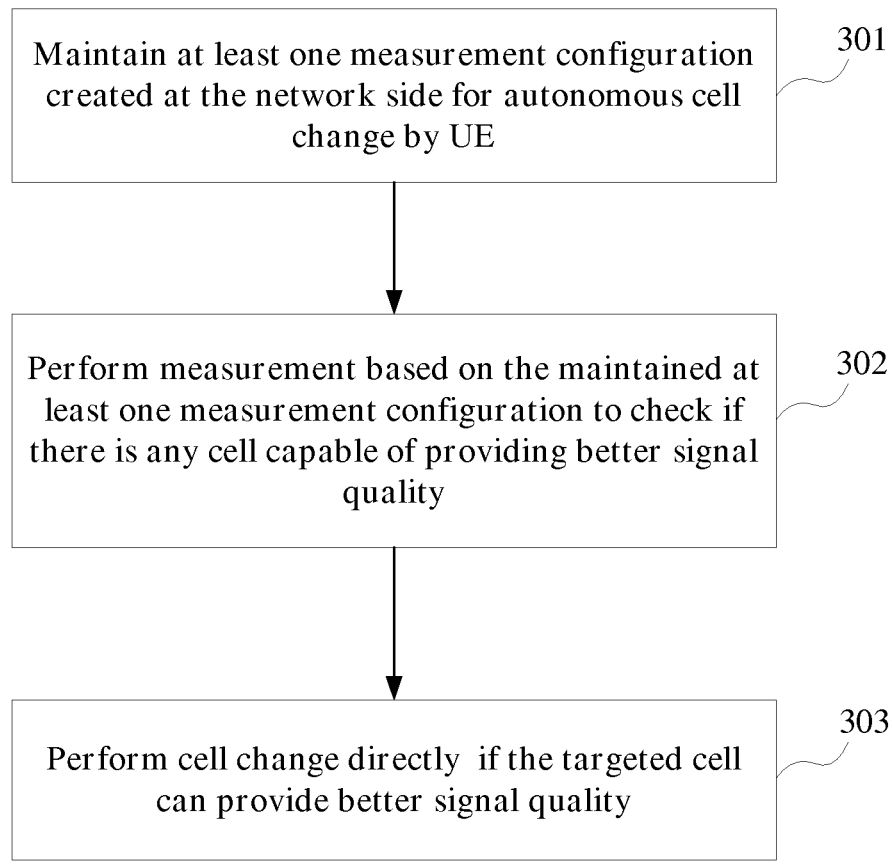
FIG. 3 is a process illustrating operations at UE according to one embodiment of the invention.

As shown in FIG. 3, at block 301, UE maintains at least one newly created measurement configuration for such autonomous cell change. As mentioned, cells supporting the invention share context of at least one UE with each other, or at least with their neighbor cells. Also, the maintained measurement configuration indicates to UE that the autonomous cell change is enabled or available allowing it to determine whether to change its serving cell itself without transmitting back its measurement report to its macro cell, such as to its macro eNB via its serving sub AP if it's within a sub cell.

At block 302, UE performs measurement based on the maintained at least one measurement configuration to see if there is any cell capable of providing better signal quality than its current serving cell.

In general heterogeneous network architecture, such measurement can be performed on neighbor cells. While for the two layer cells architecture as shown in FIG. 1, handover may occur between macro cells, between those sub cells (sub cells belong to the same or different macro cells), or between a macro cell and a sub cell (either locating within the macro cell or within its neighbor macro cell). Then as easily understood by those skilled in the art, UE may perform measurement on signals received from any possible targeted macro cell and/or sub cell. Accordingly, comparisons on the signal quality will be performed between the current serving cell (a macro cell or a sub cell) and the possible targeted one (either a macro or sub one). Here, signal quality refers to any applicable information indicating a better signal strength, quality of service and so on, the information such as RSRQ and/or RSRP or the like. In the architecture as shown in FIG. 3, by taking control over the sub AP, associated macro eNB has UE's context information and thus sharing context of UE among related macro cells are possible, wherein the potential candidate macro cells may prepare for UE's direct re-access.

Then taking a scenario in which UE moves from a sub cell to a macro cell as an example, during its moving, UE performs inter-frequency measurement on those indicated macro frequencies based on its maintained measurement configuration. When it is moving out of the sub cell's coverage, UE will perform, potentially using configured measurement gap, measurements and it checks signal quality, such as RSRP or RSRQ, of these candidate cells. If UE finds that one defined condition in a measurement event is met (maybe for a given time), such as the candidate cell's RSRP is offset-better than serving cell's RSRP, if A3 event is configured, it may decide to perform cell change directly to the targeted macro cell without reporting its measurement to its serving macro cell as prior art do. Considering the fact of details about conditions for whether to make a handover are known for those skilled in the art, the invention will not discuss this issue any more.

Then at block 303, UE performs cell change directly if the target cell provides better signal quality than its current serving cell or according to the events and configuration rules thereof.

As mentioned above for those operations at the network side, such measurement configuration indicates the available autonomous cell change by a specific identifier and/or any different configurations compared with normal measurement configurations of normal user equipment assisted and network controlled handover procedure, to facilitate UE to recognize the two types of measurement configurations. Accordingly, the type of the maintained measurement configurations may be determined based on at least one of the above features. Similarly, the measurement can be performed at any appropriate frequencies such as aforementioned inter-frequency, intra-frequency and inter radio access technologies. Considering detailed illustrative explanations when talking about the operations at the network side, here corresponding operations or the same features/characteristics are omitted.

According to one embodiment of the invention, the maintained measurement configuration may be pre-loaded into UE during its manufactory, or be received from the network after powered on.

Additionally, the measurement configurations, according to one embodiment of the invention, can be updated as the scenario varies periodically, randomly or timely.

The various blocks shown in FIGS. 2 and 3 may be seen as method steps, and/or operations which may implemented as computer program code, as a plurality of coupled logic circuit elements constructed to carry out the associated function(s). It should be noted that the depicted order and labeled steps are merely indicative of specific embodiments of the invention. Other steps and methods may be conceived that are equivalent in function, logic, or effect to one or more steps, or portions thereof. Additionally, those steps or blocks may be further combined or split for particular purpose without departing away from the basic principle or concept of the invention.

Figure 4:
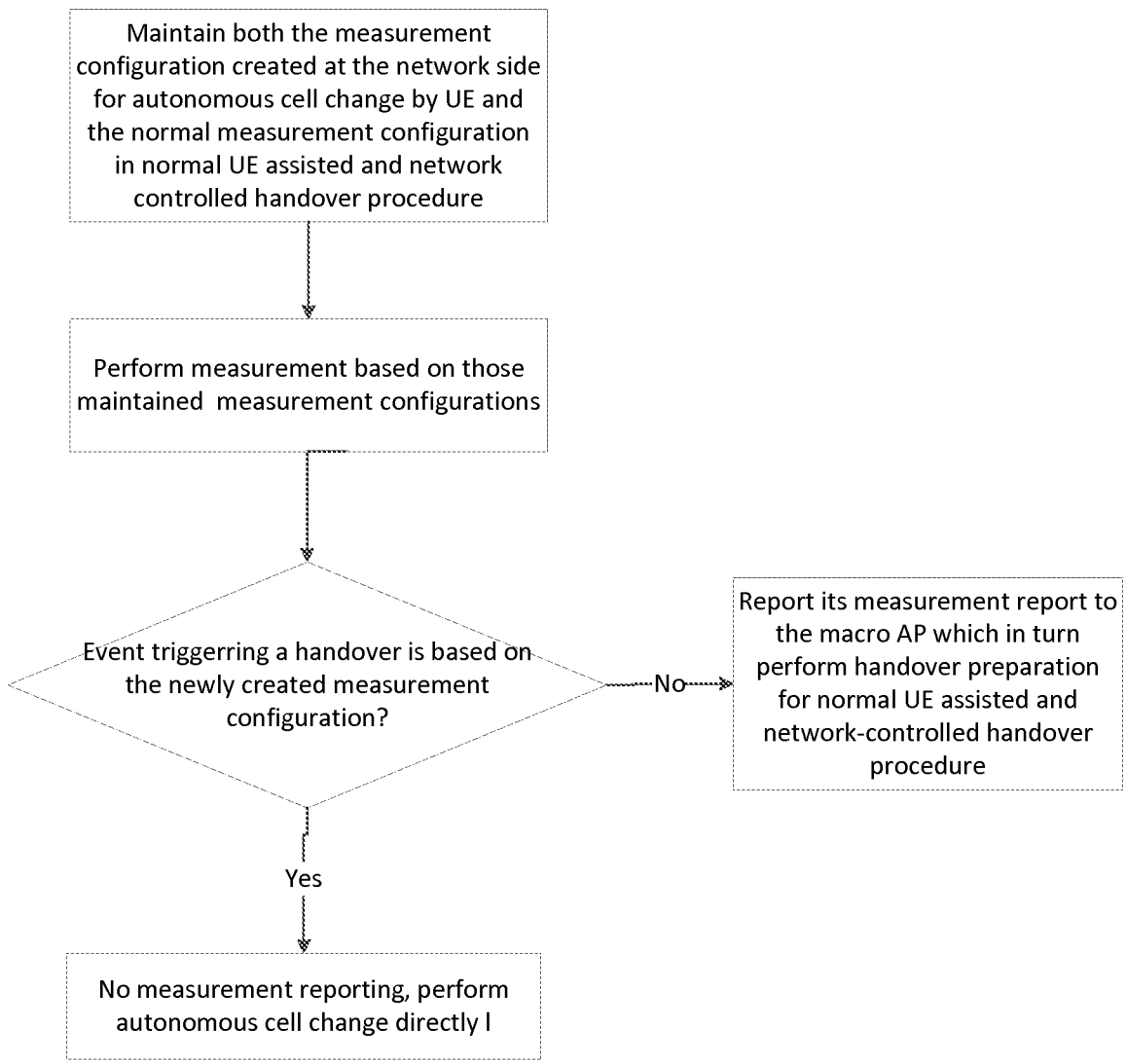
FIG. 4 is another process illustrating operations at UE according to another one embodiment of the invention.

Considering a scenario that not all the cells in the network supporting the invention according to an embodiment of the invention, UE may be also maintain those normal measurement configurations. Then as shown in FIG. 4, when it performs measurement, or at least before transmitting its measurement report as prior art, UE should determine such measurement triggering a handover is performed based on the newly created measurement configuration or the normal configuration. The determination may be made by any explicit or implicit differences mentioned above, such as a new event defined in the created measurement configuration only, or the targeted cell is the one indicated in the created measurement configuration and so on. Then if it is based on the newly created measurement configuration, UE will perform the autonomous handover without reporting its measurement. Otherwise, UE performs as specified in prior art.

Figure 5:
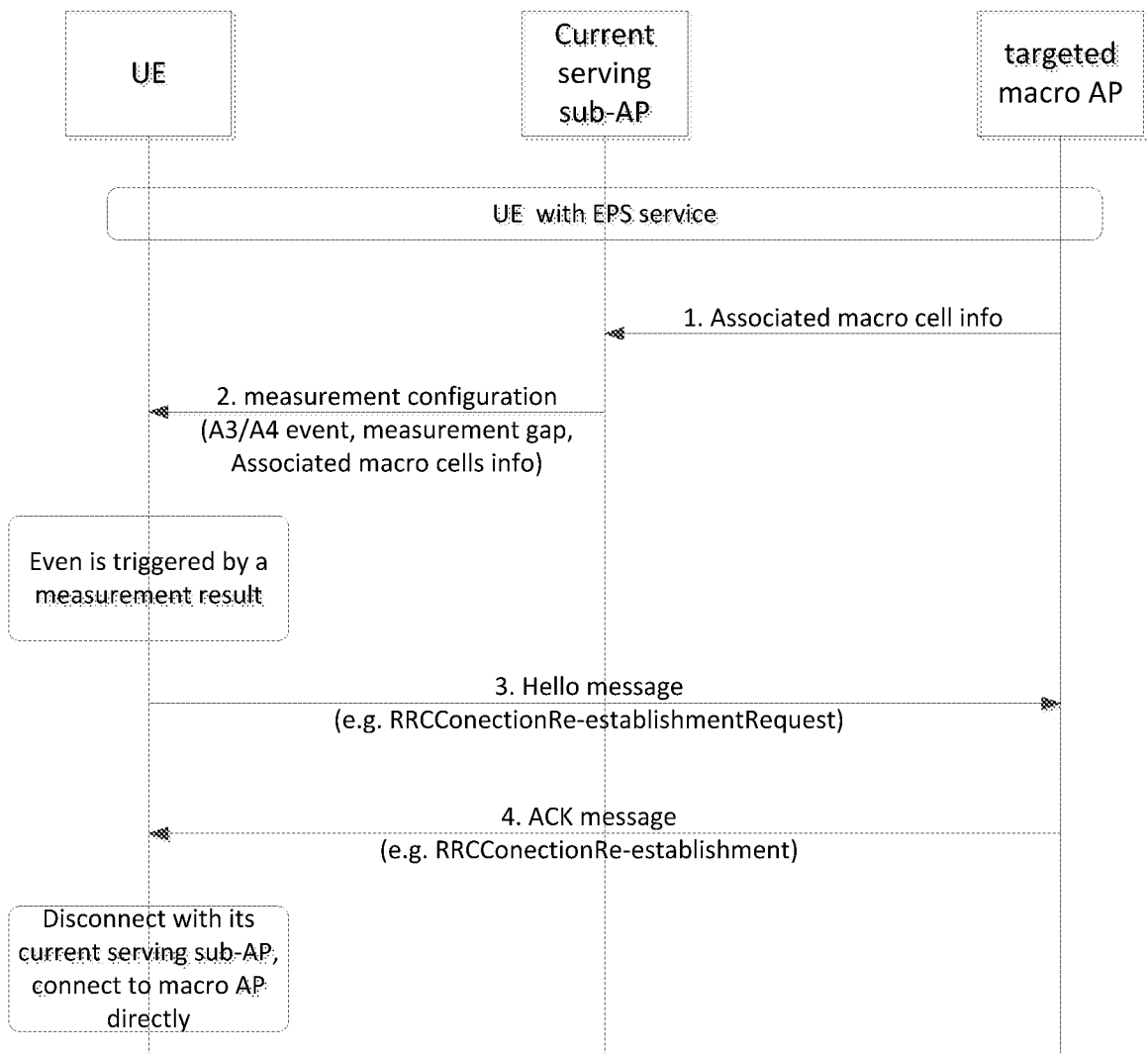
FIG. 5 is a flowchart illustrating interactions among related apparatuses in the network architecture as shown in FIG. 1 according to one embodiment of the invention.

FIG. 5 illustrates related interactions based on the network architecture as shown in FIG. 1 according to one embodiment of the invention. As shown in FIG. 5, UE is in a sub cell, and accesses the core network via its sub AP and further via its serving macro eNB. Wherein, current serving sub AP together with its macro eNB and the targeted macro eNB support the implementations of the invention, then the two macro cells share information on UE's context, and preferably the related information of the cell. Then as illustrated above, the sub AP configures the measurement configuration and transmits it to UE. Wherein some optionally parameters such as A3/A4 event, potentially measurement gap pattern and associated potential targeted macro cell information may be included in the measurement configuration. Then UE performs measurement based on its maintained measurement configurations. If certain condition of a measurement event is triggered, UE can simply and quickly connect to the target cell by initiating a "Hello" like message to it. Compared with the normal network-controlled handover procedure where UE is expecting handover command from its sub AP, such autonomous handover not only decrease related signaling handover, but also improves user experiences. As for the messages used for such direct connection, any appropriate ones either existing or newly designed can be selected. For example, the existing RRC-ConnectionReestablishmentRequest message and RRCConnectionReestablishment response can be used. However, it should be noted that as mentioned above, handover may occur between any possible cells, such as UE moves from a sub cell to another sub cell within the same macro cell, or to its serving macro cell, or to its neighbor macro cell as described with FIG. 4, or to its neighbor small cell, or to another sub cell within one of its neighbor macro cells, and vice versa. In any of those cases, UE just needs to compare the signal quality of the cell which serving it directly. It means for example, if UE is moving from a sub cell to another sub cell, it just needs to compare the signal quality of the two sub cells and does not need to consider the signal quality of corresponding serving macro cell(s). This is because as stated above, communications between sub AP and macro eNB are over S1, or X2 or the like interface, thus UE is not require to consider signal quality about traffic between the two.

Figure 6:
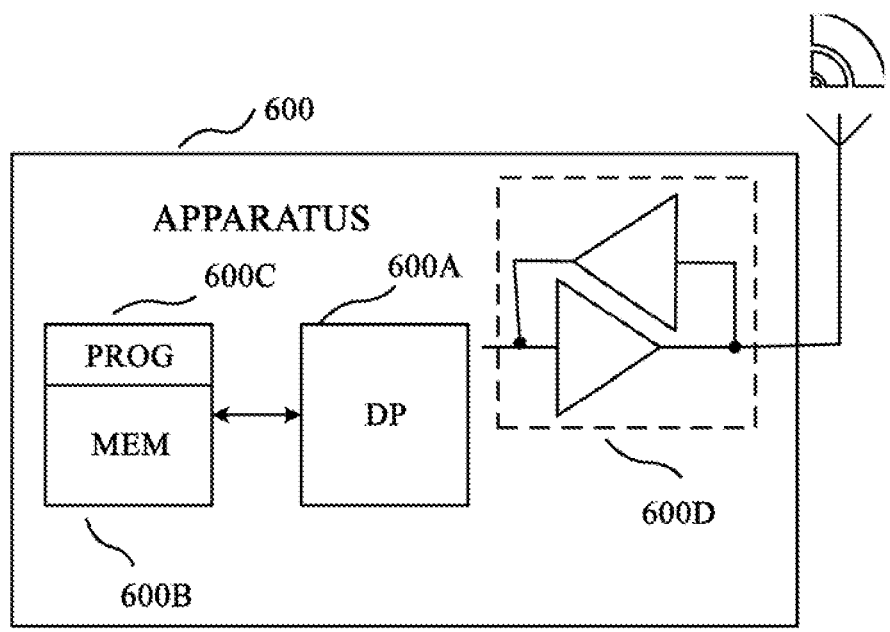
FIG. 6 an illustrated simplified block diagram of both an apparatus located in the network architecture as shown in FIG. 1 and UE applicable for implementing the invention according to another embodiment of the invention.

FIG. 6 is a simplified block diagram of an apparatus which is suitable for use in practicing exemplary embodiments of the present invention. The apparatus 600 shown in FIG. 6 may comprise a data processor (DP) 600A, a memory (MEM) 600B that stores a program (PROG) 600C, and a suitable transceiver 600D for communicating with another apparatus. Such apparatus 600 may be implemented as the apparatus creating the measurement configurations according to various embodiments of the invention, or be implemented as UE device according to various embodiments of the invention. Wherein, the transceiver 600D may be an integrated component for transmitting and/or receiving signals and messages. Alternatively, the transceiver 600D may comprise separate components to support transmitting and receiving signals/messages, respectively. The DP 600A may be used for processing those signals and messages. The PROG 600C is assumed to comprise program instructions that, when executed by the DP 600A, enable the apparatus to operate in accordance with the exemplary embodiments, as discussed above, such as the foregoing steps/operations shown in FIGS. 2 and 3. That is, the exemplary embodiments of the present invention may be implemented at least in part by computer software executable by the DP 600A of the apparatus 600, or by hardware or firmware, or by a combination thereof. The MEM 600B may be of any type suitable to the local technical environment and may be implemented using any suitable data storage technology, such as semiconductor based memory devices, flash memory, magnetic memory devices and systems, optical memory devices and systems, fixed memory and removable memory. The DP 600A may be of any type suitable to the local technical environment, and may comprise one or more of general purpose computers, special purpose computers, microprocessors, digital signal processors (DSPs) and processors based on multi-core processor architectures, as non-limiting examples.

According to another embodiment of the invention which is not shown in accompany figures, an apparatus may comprise various means, modules and/or components for implementing functions of the foregoing steps/operations shown in FIGS. 2 and 3. As easily understood by those skilled in the art, those elements or components arranged in the apparatus can be further combined with each other or be further split for meeting specific requirements when implementing the invention in a particular environment.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

With the description provided herein, the embodiments may be implemented as a machine, process, or article of manufacture by using standard programming and/or engineering techniques to produce programming software, firmware, hardware or any combination thereof. The terms "article of manufacture" and "computer program product" as used herein are intended to encompass a computer program that exists permanently or temporarily on any computer-usable medium or in any transmitting medium which transmits such a program.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. An apparatus, comprising:
at least one processor; and
at least one memory comprising computer program code,
   the at least one memory and the computer program code configured to, with the at least one processor, cause the apparatus to at least:
   identify a first cell in a network which shares, with a second cell within the network, a context of at least one user equipment;
   create at least one measurement configuration indicating that the at least one user equipment is allowed to perform an autonomous handover from the first cell to the second cell without transmitting back the measurement report to the first cell, wherein the at least one measurement configuration further indicates at least one of: a condition for triggering the autonomous handover or the second cell as a target cell for the autonomous handover, and wherein the autonomous handover is performed based at least on a signal quality of the second cell; and
   transmit, to the at least one user equipment, the at least one measurement configuration, wherein the at least one measurement configuration is transmitted to the at least one user equipment to inform the at least one user equipment that the at least one user equipment is allowed to perform the autonomous handover from the first cell to the second cell without transmitting back the measurement report to the first cell.

2. The apparatus according to claim 1, wherein the at least one measurement configuration includes a pre-defined identifier indicating that the at least one user equipment is allowed to perform the autonomous handover instead of a user equipment assisted and network controlled handover.

3. The apparatus according to claim 1, wherein the measurement configuration further comprises information indicating at least one of following:
at least one neighbor cell of the first cell that shares, with the second cell, the context of the at least one user equipment;
at least one frequency to be measured;
at least one measurement event; and
at least one event related parameter, wherein an event related parameter comprises a threshold value and/or a measurement gap.

4. The apparatus according to claim 1, wherein the network comprises a heterogeneous network in which the second cell comprises a small cell with a smaller coverage area and located adjacent to or within the first cell, and wherein the serving cell of the user equipment is changed, based at least on the measurement configuration, from the first cell to the second cell.

5. The apparatus according to claim 4, wherein an access node of the first cell provides access service to an access node of the second cell, in response to the second cell being located within the first cell.

6. A method, comprising:
receiving, at a user equipment, at least one measurement configuration, wherein the at least one measurement configuration is created at a network that includes a first cell and a second cell, wherein the first cell comprises a current serving cell of the user equipment, wherein the first cell shares, with the second cell, a context of the user equipment, wherein the at least one measurement configuration informs the user equipment that the user equipment is allowed to perform an autonomous handover from the first cell to the second cell without transmitting the measurement report to the first cell, and wherein the at least one measurement configuration further indicates at least one of: a condition for triggering the autonomous handover or the second cell as a target cell for the autonomous handover;

performing, based at least on the at least one measurement configuration, a measurement of a signal quality of the second cell; and in response to the measurement indicating that the second cell provides a better signal quality than the first cell, performing the autonomous handover to the second cell, wherein the autonomous handover to the second cell is performed without transmitting the measurement report to the first cell, and wherein the performance of the autonomous handover changes the current serving cell of the user equipment from the first cell to the second cell.

7. The method according to claim 6, wherein the at least one measurement configuration includes a pre-defined identifier indicating that the at least one user equipment is allowed to perform the autonomous handover instead of a user equipment assisted and network controlled handover procedure.

8. The method according to claim 6, wherein the at least one measurement configuration further comprises information indicating at least one of following:
- at least one neighbor cell of the first cell;
- at least one frequency to be measured;
- at least one measurement event; and
- at least one event related parameter, wherein an event related parameter comprises a threshold value and/or a measurement gap.

9. The method according to claim 6, wherein the user equipment further maintains at least one normal measurement configuration of a user equipment assisted and network controlled handover procedure.

10. The method according to claim 9, further comprising determining, based at least on a predefined identifier, whether the user equipment is to perform the autonomous handover or a user equipment assisted and network controlled handover.

11. The method according to claim 6, wherein the network comprises a heterogeneous network in which the second cell comprises a small cell with a smaller coverage area and located adjacent to or within the first cell, and wherein the serving cell of the user equipment is changed, based at least on the measurement configuration, from the first cell to the second cell.

12. The method according to claim 6, wherein the user equipment is configured to perform the at least one measurement on an inter-frequency frequency, an intra-frequency frequency, and/or an inter radio access technology frequency.

13. An apparatus, comprising:
at least one processor; and
at least one memory comprising computer program code, the at least one memory and the computer program code configured to, with the at least one processor, cause the apparatus to at least:

receive at least one measurement configuration, wherein the at least one measurement configuration is created at a network that includes a first cell and a second cell, wherein the first cell comprises a current serving cell of the apparatus, wherein the first cell shares, with the second cell, a context of the apparatus, wherein the at least one measurement configuration informs the apparatus that the apparatus is able to perform an autonomous handover from the first cell to the second cell without transmitting the measurement report to the first cell, and wherein the at least one measurement configuration further indicates at least one of: a condition for triggering the autonomous handover or the second cell as a target cell for the autonomous handover;

perform, based at least on the at least one measurement configuration, a measurement of a signal quality of the second cell; and in response to the measurement indicating that the second cell provides a better signal quality than the first cell, perform the autonomous handover to the second cell, wherein the autonomous handover to the second cell is performed without transmitting the measurement report to the first cell, and wherein the performance of the autonomous handover changes the current serving cell of the apparatus from the first cell to the second cell.

14. The apparatus according to claim 13, wherein the at least one measurement configuration includes a pre-defined identifier indicating that the at least one user equipment is allowed to perform the autonomous handover instead of a user equipment assisted and network controlled handover procedure.

15. The apparatus according to claim 13, wherein the at least one measurement configuration further comprises information indicating at least one of following:
- at least one neighbor cell of the first cell;
- at least one frequency to be measured;
- at least one measurement event; and
- at least one event related parameter, wherein an event related parameter comprises a threshold value and/or a measurement gap.

16. The apparatus according to claim 13, wherein the apparatus further maintains at least one normal measurement configuration of a user equipment assisted and network controlled handover procedure.

17. The apparatus according to claim 16, wherein the apparatus is further caused to at least determine, based at least on a predefined identifier, whether the user equipment is to perform an autonomous handover or a user equipment assisted and network controlled handover.

18. The apparatus according to claim 13, wherein the network comprises a heterogeneous network in which the second cell comprises a small cell with a smaller coverage area and located adjacent to or within the first cell, and wherein the serving cell of the user equipment is changed, based at least on the measurement configuration, from the first cell to the second cell.

19. The apparatus according to claim 13, wherein the at least one measurement configuration is pre-loaded onto the apparatus or received from the network after the apparatus is powered on.

* * * * *

UNITED STATES PATENT AND TRADEMARK OFFICE
CERTIFICATE OF CORRECTION

| | |
|---|---|
| PATENT NO. | : 11,212,723 B2 |
| APPLICATION NO. | : 14/401438 |
| DATED | : December 28, 2021 |
| INVENTOR(S) | : Li et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 58 days.

Signed and Sealed this
Thirteenth Day of December, 2022

Katherine Kelly Vidal
*Director of the United States Patent and Trademark Office*